Patented June 28, 1932

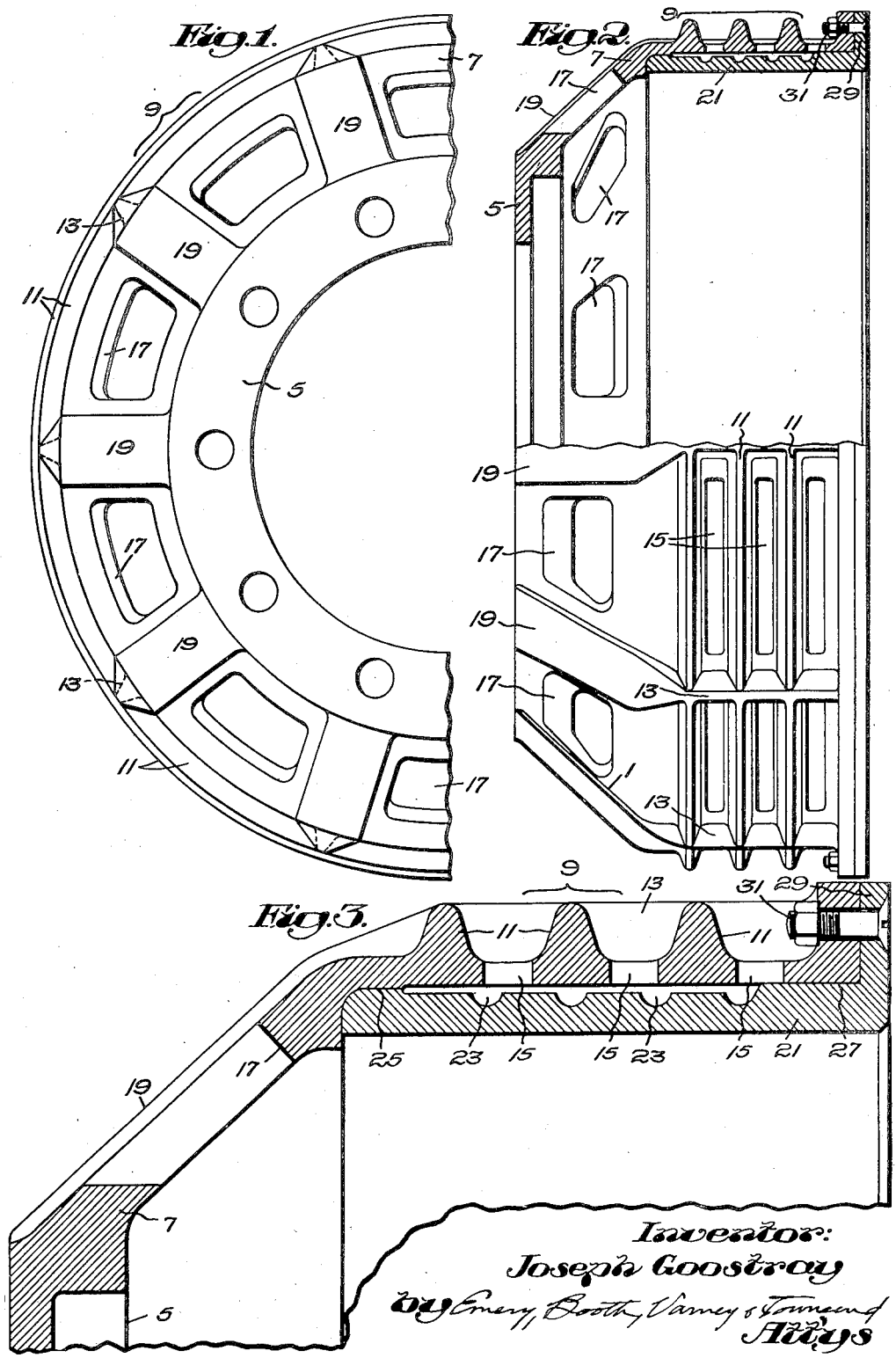

1,865,311

UNITED STATES PATENT OFFICE

JOSEPH GOOSTRAY, OF EAST MILTON, MASSACHUSETTS, ASSIGNOR TO HUNT-SPILLER MANUFACTURING CORPORATION, OF BOSTON, MASSACHUSETTS, A CORPORATION OF MASSACHUSETTS

BRAKE DRUM

Application filed April 11, 1931. Serial No. 529,341.

This invention relates to brake drums and the object is to provide an improved construction of drum and one having a renewable braking surface which will be efficient, durable and quiet in operation. The invention finds a particular application to use on heavy automotive vehicles such as busses and trucks.

My invention will be well understood by reference to the following description of an illustrative embodiment thereof taken in connection with the accompanying drawing, wherein:—

Fig. 1 is a partial side elevation of a brake drum;

Fig. 2 is an end elevation with part broken away; and

Fig. 3 is an enlarged section.

The drum shown in the drawing comprises a supporting body to which is fitted a renewable liner which provides the active braking surface. The supporting body herein shown is conveniently formed of cast steel and may comprise an attaching flange 5, adapted to be bolted to the wheel, from which rises the web 7 carrying a cylindrical portion 9 adapted to support the braking surface proper for cooperation with brake shoes of the internal expanding type.

The cylindrical portion 9 is skeletonized and herein is shown as formed by deep intersecting circumferential ribs 11 and transverse ribs 13 defining spaces between them which are open-bottomed to provide through openings 15 to the interior surface of the cylindrical portion. The web 7 may be pierced with openings 17 to lighten it and provide for ventilation, and is preferably reinforced by ribs 19 which may extend and merge into the transverse ribs 13. The construction of the body described embodies principles disclosed in my Patent No. 1,775,521, dated September 9, 1930, and realizes many of the advantages thereof.

The actual braking surface is provided by a liner 21, preferably cast iron, the wearing qualities of which are well known. It takes the form generally of a cylindrical annulus removably fitted to the interior circumference of the cylindrical portion 9, the outer circumference of the liner 21 being presented to the openings and it being therefore cooled on account of ventilation through these openings. Herein the liner 21 is supported at its margins and preferably the interior diameter of the cylindrical portion 9 of the supporting body is substantially greater than the exterior diameter of the central portion of the liner 21 so that there is a clearance therebetween, as seen in Fig. 3, through which air may circulate. The back of the liner 21 may also be provided with suitable grooves 23 whereby it is relatively stiff for a given weight while circulation of cooling air is promoted.

Herein the inner margin of the cylindrical portion 9 is formed with a seat 25 of relatively small diameter and the outer margin with a seat 27 of relatively great diameter, the marginal portions of the liner 21 being of dimensions to cooperate with these seats. The liner may thus be inserted from the right in Fig. 3 freely without effort and without strain on the parts, there being a clearance between the interior surface of the liner and the interior surface of the supporting body, until the cooperating seats approach opposition. The liner may then be forced home and will be firmly supported throughout its circumference at the margins. Removal of the latter for replacement is correspondingly simple.

Suitable means may be provided for securing the liner in position, and I have herein shown the same as provided with a radial flange 29 at its outer side which may oppose the outermost of the ribs 11 and may be nonrotatably secured in position by means of bolts 31.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:—

1. A brake drum having a supporting body provided with a cylindrical portion skeletonized to provide a plurality of openings therethrough between its margins and a cast metal liner removably fitted within said cylindrical portion and having its margins bearing on and supported thereby and having its exterior surface between said openings exposed to said openings.

2. A brake drum having a supporting body provided with a cylindrical portion skeletonized to provide a plurality of openings therethrough between its margins and a cast metal liner removably fitted within said cylindrical portion and having its margins supported on the margins of the supporting body and having its exterior surface between the margins spaced from the body opposite said openings.

3. A brake drum having a supporting body provided with a cylindrical portion skeletonized to provide a plurality of openings therethrough between its margins and having an inner marginal seat of relatively small diameter and an outer marginal seat of relatively great diameter and a cast metal liner having cooperating seats on its exterior surface, said liner constructed to enter said body with a clearance until said seats come together.

4. A brake drum having a supporting body provided with a cylindrical portion skeletonized to provide a plurality of openings therethrough between its margins and having an inner marginal seat of relatively small diameter and an outer marginal seat of relatively great diameter and a cast metal liner having cooperating seats on its exterior surface, said liner constructed to enter said body with a clearance until said seats come together, the portions of said body and liner between said seats being of such inner and outer diameter respectively as to provide a clearance between the same when the liner is seated.

5. A brake drum comprising an attaching web, a cylindrical portion overhanging therefrom constructed from deep intersecting ribs defining through openings therebetween and a removable cast metal liner removably fitted to the interior of said cylindrical portion with its marginal portion seated within and bearing on the marginal portions of said cylindrical portion and having its exterior surface exposed to said openings.

6. A brake drum having a supporting body provided with a cylindrical portion skeletonized to provide a plurality of openings therethrough between its margins and having an inner marginal seat of relatively small diameter and an outer marginal seat of relatively great diameter and a cast metal liner having cooperating seats on its exterior surface, said liner constructed to enter said body with a clearance until said seats come together, said liner having an outer radial flange non-rotatably secured at the outer base of said cylindrical portion.

7. A brake drum having a supporting body provided with a cylindrical portion and having an inner marginal seat of relatively small diameter and an outer marginal seat of relatively great diameter and a cast metal liner having cooperating seats on its exterior surface, said liner constructed to enter said body with a clearance until said seats come together, the portions of said body and liner between said seats being of such inner and outer diameter respectively as to provide a clearance between the same when the liner is seated, there being channels venting said clearance space to atmosphere.

8. A brake drum having a body comprising an attaching portion and a cylindrical portion overhung therefrom, there being a substantially radial shoulder at the inner side of said cylindrical portion, said cylindrical portion having interior seat portions of different diameters decreasing toward the inner side, a liner having cooperating seats on its exterior surface and constructed to enter within said cylindrical portion with a clearance between the seats of said liner and of the body respectively until the edge of the liner approaches said shoulder, and securing means for holding the liner against said shoulder and against rotation.

9. A brake drum having a body comprising an attaching portion and a cylindrical portion overhung therefrom, there being a substantially radial shoulder at the inner side of said cylindrical portion, said cylindrical portion having interior seat portions of different diameters decreasing toward the inner side, a liner having cooperating seats on its exterior surface and constructed to enter within said cylindrical portion with a clearance between the seats of said liner and of the body respectively until the edge of the liner approaches said shoulder, and securing means cooperating with the outside edge of the liner and of said body for holding the liner against said shoulder and against rotation.

10. A brake drum having a body comprising an attaching portion and a cylindrical portion overhung therefrom, there being a substantially radial shoulder at the inner side of said cylindrical portion, a liner having an edge to oppose said shoulder and adapted to enter said cylindrical portion to be supported thereby and slide thereon into contact with said shoulder, and readily detachable means at the outer side of said body and liner for holding the latter in contact with said shoulder and against rotation relatively to the former.

In testimony whereof, I have signed my name to this specification.

JOSEPH GOOSTRAY.